United States Patent
Nelson et al.

(10) Patent No.: US 6,802,292 B2
(45) Date of Patent: Oct. 12, 2004

(54) ENGINE INTAKE MANIFOLD

(75) Inventors: Brian John Nelson, Royal Oak, MI (US); Gregory Dykstra, Grosse Pointe Woods, MI (US); Matthew George Nyquist, Grosse Pointe, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 21 days.

(21) Appl. No.: 10/305,249

(22) Filed: Nov. 27, 2002

(65) Prior Publication Data

US 2004/0099235 A1 May 27, 2004

(51) Int. Cl.⁷ .............................................. F02M 35/10
(52) U.S. Cl. ............................................... 123/184.36
(58) Field of Search ...................... 123/184.36, 184.31, 123/184.55, 184.25, 184.26, 184.35, 184.34, 184.43, 184.44, 184.48, 184.49, 184.21

(56) References Cited

U.S. PATENT DOCUMENTS

| | | | | |
|---|---|---|---|---|
| 4,957,071 A | * | 9/1990 | Matsuo et al. | 123/184.36 |
| 5,632,239 A | | 5/1997 | Patyi et al. | |
| 5,911,205 A | * | 6/1999 | Gambardella | 123/184.35 |
| 6,260,528 B1 | | 7/2001 | Pringle et al. | |

* cited by examiner

Primary Examiner—Tony M. Argenbright
Assistant Examiner—Hyder Ali
(74) Attorney, Agent, or Firm—Thomas A. Jurecko

(57) ABSTRACT

An intake manifold for a V-type engine includes an air inlet for admitting air into the manifold, a first plenum in fluid communication with the air inlet, and second and third plenums that are each in fluid communication with the first plenum. The intake manifold also includes a short runner for each cylinder of the engine, which short runner connects the first plenum to the cylinder. The intake manifold further includes two sets of long runners. The first set of long runners connects the second plenum to one bank of engine cylinders, and the second set of long runners connects the third plenum to the other bank of cylinders.

4 Claims, 2 Drawing Sheets

ENGINE INTAKE MANIFOLD

FIELD OF THE INVENTION

The present invention relates to an intake manifold for an internal combustion engine.

BACKGROUND OF THE INVENTION

The intake manifold of an internal combustion engine defines a flow path between a throttle valve and each cylinder of the engine. In an intake manifold of a certain type, there are two separate, parallel flow passages in the flow path downstream from the throttle valve, and the air flow passing through the throttle valve may be divided between the two flow passages under certain operating conditions. The two flow passages converge in the flow path before the flow path reaches the cylinder. The first of the two flow passages includes a long runner plenum and a long runner for each cylinder, and the second flow passage includes a short runner plenum and short runners a short runner for each cylinder. The purpose of the long and short runners is to improve the volumetric efficiency of the engine at both high and low engine speed ranges.

In operation, the air flow into the cylinders of the engine is controlled by adjusting the opening of the throttle valve. The air passing through the throttle valve may be divided between the two flow passages. At a low engine speed, the short runners are blocked, and the intake air passes through the long runner plenum and the long runners to reach the cylinders. At a high engine speed, the short runners are unblocked, and the intake air flows through the short runner plenum and the short runners, as well as the long runner plenum and the long runners, to reach the cylinders. The air flows from the long and short runners for each cylinder converge before the air flow reaches the cylinder.

U.S. Pat. No. 5,632,239 describes an example of the conventional intake manifold for a V-6 engine. FIGS. 1 and 2 of the patent show a three-plenum air distributing manifold 10. Referring to FIG. 2 of the patent, the manifold 10 has a long runner plenum 22, 24 for each bank of cylinders, and all cylinders share a short runner plenum 14 disposed between the long runner plenums 22, 24. The long runner plenums 22 and 24 are connected to one another at one end of the manifold 10 adjacent the throttle body 16 by transversely extending zip tubes 28 and 30. The long runner plenums 22, 24 are also connected to one another at an opposite end of the manifold 10 by a laterally extending crossover passage 34. The flow through the cross over passage 34 is regulated by a manifold tuning valve 42 which is mounted at a mid-position in crossover passage 34. The MTV 42 has a valve plate 43 which is selectively pivoted between opened and closed positions by an actuator.

As shown in FIG. 1, the left side long runner plenum 22 is connected to the three cylinders in the right hand cylinder bank of the engine 12 by long runners 50, 52 and 54. As shown in FIGS. 1 and 3, the right side long runner plenum 24 is connected to the three cylinders of the left hand bank by long runners 64, 66 and 68.

Referring now to FIGS. 3 and 4, the manifold 10 has six short runners 80, 82, 84, 86, 88 and 90 connecting the short runner plenum 14 to the six cylinders, respectively.

The air flow through each of the short runners is controlled by closing or opening a short runner valve 96 as best seen in FIGS. 3 and 4 ( ). In the closed position of the short runner valve 96, air flow through the short runners 80–90 is blocked. Resultantly, air flow to the engine cylinders is through the throttle body 18, zip tubes 28, 30, long runner plenums 22, 24, and long runners 80, 82, 84, 86, 88, and 90, before the intake air enters the cylinders. This operative mode for the intake system is advantageous for idle and low speed operation of the engine.

The engine performance over a relatively high speed range, such as a wide open throttle condition, is enhanced by directing air flow from the short runner plenum 14 and through the short runners 80, 82, 84, 86, 88, and 90. This is accomplished by opening the short runner valves 96. The intake air flows directly from the short runner plenum 14, through the short runners 80, 82, 84, 86, 88, and 90, and into the engine cylinders.

The conventional intake manifold has a number of problems. For example, when the engine speed is low and the short runners are blocked, various residual gases are collected in the short runner plenum. The residual gases include exhaust gas recirculation (EGR) gas, fuel tank purge vapor, and positive crankcase ventilation gas. When the throttle valve is closed or near the closed position, such as during deceleration of the vehicle, the residual gases stored in the short runner plenum are sucked into the cylinders via the long runner plenum and long runners, and must be compensated for by the engine control system. This increases the difficulties of controlling the engine and reduces the accuracy of engine control.

In addition, the conventional intake manifold has poor mixing of EGR gas with the intake air. The exhaust gases for each cylinder bank are introduced to the intake air either separately (one EGR entry point for each cylinder bank) or they enter at a point very close to the point where the manifold splits the air flow between the cylinder banks. As a result, the length of the flow path is not long enough to achieve sufficient mixing of the EGR gas with the intake air.

Further, the conventional intake manifold, such as the one shown in FIG. 2 of U.S. Pat. No. 5,632,239, is so wide that it is difficult to mount the engine transversely in the engine compartment of the vehicle, because the conventional intake manifold must be wide enough to accommodate the width of the two long runner plenums and the length of two sets of long runners.

SUMMARY OF THE INVENTION

The present invention overcomes some of the problems associated with the conventional intake manifold by providing an intake manifold for a V-type engine having first and second banks of cylinders, wherein the intake manifold includes an air inlet for admitting air into the manifold, a first plenum in fluid communication with the air inlet, and second and third plenums that are each in fluid communication with the first plenum. The intake manifold includes a short runner for each cylinder of the engine, which short runner connects the first plenum to the cylinder. The intake manifold further includes two sets of long runners. Each long runner of the first set connects the second plenum to a cylinder of the first cylinder bank, and each long runner of the second set connects the third plenum to a cylinder of the second cylinder bank.

In low speed engine operation, the short runners are closed, and the intake air enters the manifold through the air inlet, passes through the first plenum and then through the second and third plenums, and passes through the long runners, before the intake air reaches the cylinders.

In high speed operation, the short runners are open. In addition to the air flow passing through the long runners, a large portion of the intake air passes through the short runners to reach the cylinders. The air flows passing through the long and short runners converge before the intake air reaches the cylinders.

In accordance with another aspect of the invention, an intake manifold includes an air inlet for admitting air into the manifold, and first, second and third plenums each in fluid communication with the air inlet, wherein the second and third plenums are substantially vertically aligned and preferably are placed on one side of the first plenum. The intake manifold includes a short runner for each cylinder of the engine, which short runner connects the first plenum to the cylinder. The intake manifold further includes two sets of long runners. Each long runner of the first set connects the second plenum to a cylinder of the first cylinder bank, and each long runner of the second set connects the third plenum to a cylinder of the second cylinder bank.

The second and third plenums, i.e. the long runner plenums, may be connected through a manifold tuning valve. The manifold tuning valve is closed during wide open throttle and/or low-vacuum (i.e. high engine load) conditions at the lower range of engine speeds. The closed valve causes acoustic pressure waves generated in each of the long runner plenums to return to the interior of the plenum and constructively act upon the pulsed air flow caused by opening and closing of the engine intake valves. As a result, the air flow through the long runners is enhanced to improve the engine's volumetric efficiency and torque.

The present invention has a number of advantages over the conventional intake manifold. For example, in accordance with one aspect of the invention, the first plenum connected to the short runners is no longer a deadend when the short runners are closed. When the short runners are closed, the air passes through the first plenum on its way to the second and third plenums connected to the long runners. Consequently, even when the short runners are closed, there are no residual gases collecting in the first plenum.

In addition, the distribution and mixing of gases (i.e. EGR gas, fuel tank purge vapor, and positive crankcase ventilation gas) with the intake air may be improved in the present invention, because the mixing length and time can be increased due to the increased length of air flow to the long runners. The air flow to the long runners may pass through not only the long runner plenums but also the short runner plenum. This assures a more homogenous mixture of introduced gases and intake air, and reduces cylinder-to-cylinder variation in fuel/air ratio.

Further, the intake manifold of the present invention may be narrower than the conventional intake manifold, so that the engine can be relatively easily mounted transversely in the engine compartment of the vehicle. The intake manifold of the present invention may be narrower because the long runner plenums may be stacked vertically on top of each other on one side of the short runner plenum. In the conventional manifold, on the other hand, the long runner plenums are spread out horizontally on both sides of the short runner plenum.

Still further, because the long runner plenums may be vertically stacked and the distance between the two plenums may be small, the passage between the long runner plenums can be short. As a result, the energy-loss from the pressure waves which travel between the two long runner plenums for the purpose of manifold tuning is reduced, resulting in greater tuning efficiency. In a conventional design, on the other hand, each long runner plenum is positioned over a cylinder bank, and the passage between the two plenums is a long tube or duct. The length and volume of this tube or duct increases the energy-loss of the pressure waves, resulting in low tuning efficiency.

DETAILED DESCRIPTION OF PREFERRED EMBODIMENTS

Figure 1:
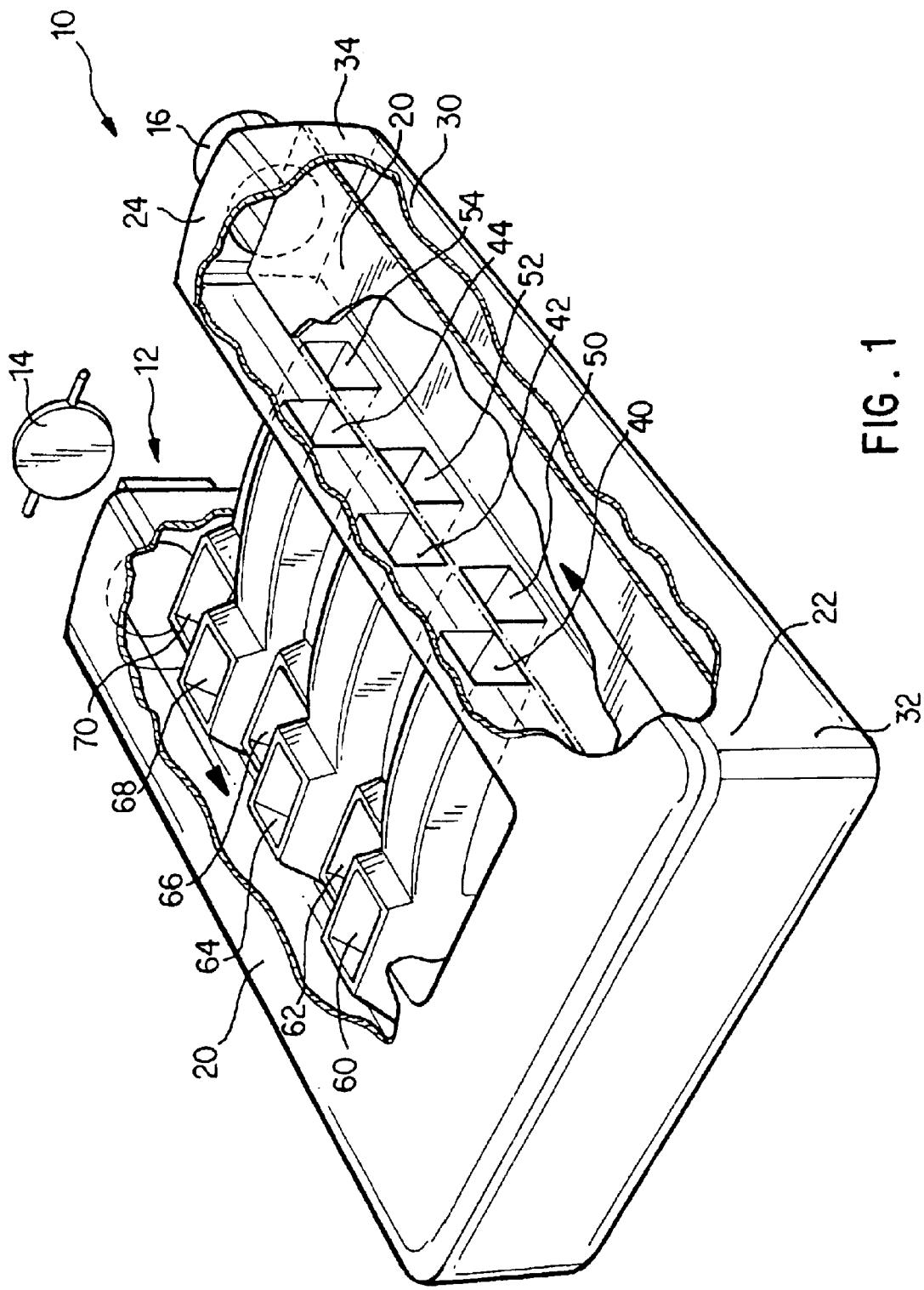
FIG. 1 is a perspective view of an embodiment of the invention.
Figure 2:
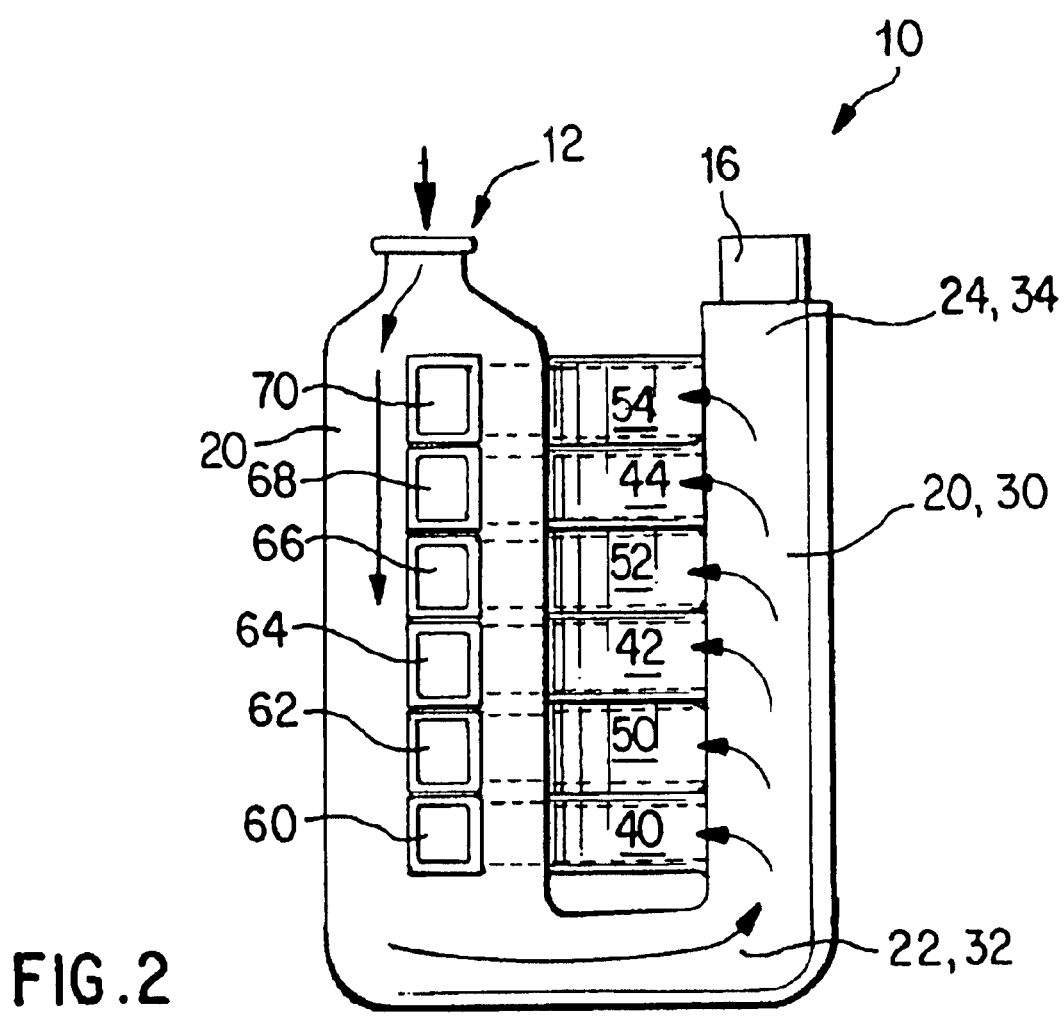
FIG. 2 is a schematic top view of the embodiment of FIG. 1.

FIGS. 1 and 2 illustrate an intake manifold 10 of the present invention for a V-type, six-cylinder internal combustion engine. The intake manifold 10 preferably is fully active to provide multiple tuning peaks which are effective at different engine speed ranges to optimize engine torque. The intake manifold 10 has a short runner plenum 20 into which intake air is fed through a throttle body 12. The throttle body 12 may house a throttle plate 14 shown diagrammatically separated from the throttle body 12 but in reality is operatively mounted therein in a manner allowing it to be pivoted so as to control air flow into the intake manifold 10.

In addition to the short runner plenum 20, the intake manifold 10 has first and second long runner plenum 30s 20, 30, each of which preferably has first ends 22, 32 and second ends 24, 34. The first ends 22, 32 of the long runner plenums 20, 30 preferably are each connected to the short runner plenum 20, and the second ends 24, 34 of the long runner plenums 20, 30 preferably are connected to each other via a manifold tuning valve 16. The manifold tuning valve 16 is closed during idle and over a lower range of engine speeds. The closed valve 16 causes acoustic pressure waves generated in each of the long runner plenums 20, 30 to return to the interior of the long runner plenums 20, 30 and constructively act upon the pulsed air flow caused by opening and closing of the engine intake valves. As a result, the air flow to the cylinders is enhanced to improve the engine's volumetric efficiency and torque.

Preferably, the long runner plenums 20, 30 are stacked on top of one another. For example, they may be vertically aligned, and generally parallelly arranged. It is also possible to form the two long runner plenums from a single manifold that is divided by a wall into two separate spaces. As shown in FIG. 2, the first long runner plenum 20 preferably is connected to the three cylinders in one cylinder bank of the engine by three long runners 40, 42, 44. The second long runner plenum 30 preferably is connected to the three cylinders of the other cylinder bank by three other long runners 50, 52, 54.

The short runner plenum 20 is shared by all cylinders of the engine and is connected to the six cylinders by six short runners 60, 62, 64, 66, 68, 70, respectively. The air flow through each of the short runners 60, 62, 64, 66, 68, 70 is controlled by a short runner valve. Each of the valves may be a butterfly-type plate valve attached to a common shaft. The shaft is supported for rotation by the intake manifold 10. The shaft can be rotated so that the valves are moved to an open position or to a closed position. In the closed position, air flow through the short runners 60, 62, 64, 66, 68, 70 is blocked. As a result, air flow to the engine cylinders is through the throttle body 12, short runner plenum 20, long runner plenums 20, 30, and long runners 40, 42, 44, 50, 52, 54. This operative mode for the intake system is advantageous for idle and low speed operation of the engine.

The engine performance over a relatively high speed range, such as a wide open throttle condition, is enhanced by direct air flow from the short runner plenum 20 into the cylinders through the short runners 60, 62, 64, 66, 68, 70. This is accomplished by opening the short runner valves. The intake air then flows from the short runner plenum 20, through the short runners 60, 62, 64, 66, 68, 70, and into the cylinders. A smaller portion of the intake air may still pass through the long runners 40, 42, 44, 50, 52, 54 even when the short runners 60, 62, 64, 66, 68, 70 are open.

What is claimed is:

1. An intake manifold for a V-type engine having first and second banks of cylinders, the manifold comprising:

an air inlet for admitting air into the manifold;

a first plenum in fluid communication with the air inlet;

a short runner for each cylinder of the engine, the short runner connecting the first plenum to the cylinder of the engine;

a second plenum in fluid communication with the first plenum;

a long runner for each cylinder of the first cylinder bank, the long runner connecting the second plenum to the cylinder of the first cylinder bank;

a third plenum in fluid communication with the first plenum, wherein the second and third plenums are substantially vertically aligned; and a long runner for each cylinder of the second cylinder bank, the long runner connecting the third plenum to the cylinder of the second cylinder bank, wherein intake air flow passing through the long runners enters the manifold through the air inlet, passes through the first plenum, and then passes through the second and third plenums, before the intake air flow enters the long runners.

2. The intake manifold of claim 1, wherein each of the second and third plenums has first and second ends, and the first plenum is connected to the first ends of the second and third plenums, and wherein the manifold further comprising a manifold tuning valve connected to the second ends of the second and third plenums.

3. An intake manifold for a V-type engine having first and second banks of cylinders, the manifold comprising:

an air inlet for admitting air into the manifold;

a first plenum in fluid communication with the air inlet;

a short runner for each cylinder of the engine, the short runner connecting the first plenum to the cylinder of the engine;

a second plenum in fluid communication with the air inlet;

a long runner for each cylinder of the first cylinder bank, the long runner connecting the second plenum to the cylinder of the first cylinder bank;

a third plenum in fluid communication with the air inlet, wherein the second and third plenums are substantially vertically aligned.

4. The intake manifold of claim 3, wherein each of the second and third plenums has an end, and wherein the manifold further comprising a manifold tuning valve connected to the ends of the second and third plenums.

* * * * *